No. 697,626. Patented Apr. 15, 1902.
F. H. HYDE.
RUBBER VEHICLE TIRE.
(Application filed Aug. 15, 1901.)
(No Model.)
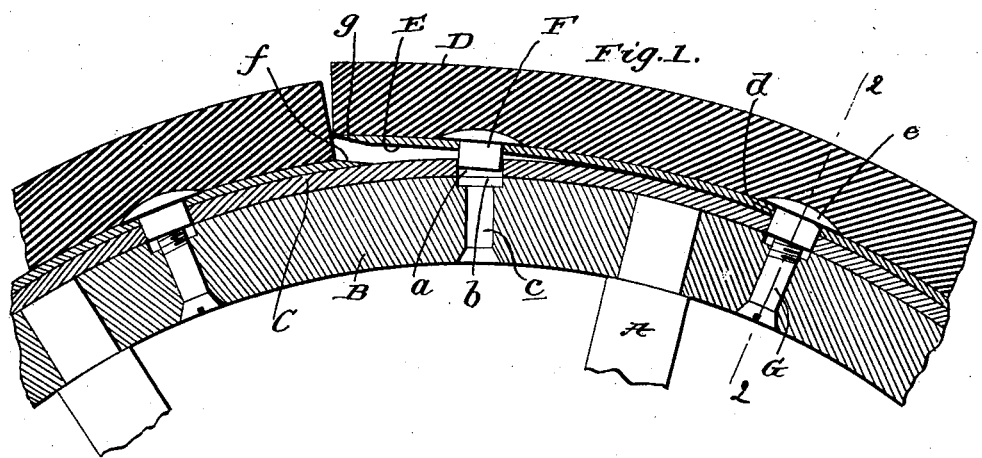
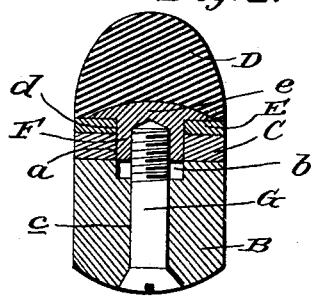
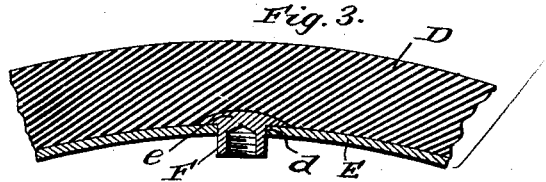
Witnesses
Inventor
Frank H. Hyde.
By James J. Sheehy, Attorney

UNITED STATES PATENT OFFICE.

FRANK HOWARD HYDE, OF TORONTO, CANADA.

RUBBER VEHICLE-TIRE.

SPECIFICATION forming part of Letters Patent No. 697,626, dated April 15, 1902.

Application filed August 15, 1901. Serial No. 72,202. (No model.)

*To all whom it may concern:*

Be it known that I, FRANK HOWARD HYDE, a citizen of the United States, residing at Toronto, in the county of York, Province of Ontario, Dominion of Canada, have invented new and useful Improvements in Rubber Vehicle-Tires, of which the following is a specification.

My invention relates to solid-rubber tires for vehicle-wheels and means for attaching the same to wheel-fellies; and it consists in a certain peculiar construction the novelty, utility, and practical advantages of which will be fully understood from the following description and claims when taken in conjunction with the accompanying drawings, in which—

Figure 1 is a vertical longitudinal section of a portion of a metallic-tire vehicle-wheel equipped with my improvements; Fig. 2, a transverse section taken in the plane indicated by the line 2 2 of Fig. 1; and Fig. 3, a detail section illustrative of the manner in which the metallic rim, the headed nuts, and the rubber tire of my improvements are vulcanized together.

Similar letters of reference designate corresponding parts in all the views of the drawings, referring to which—

A A are the spokes, B the felly, and C the metallic tire, of a vehicle-wheel, all of which may be and preferably are of the ordinary construction, with the exception that the tire C is provided at intervals with apertures $a$ and the felly B is provided at intervals in its outer perimeter with sockets $b$, coincident with the apertures $a$, and is also provided with radial apertures $c$, which communicate with and extend inwardly from the sockets $b$.

D is the solid tire, of rubber or equivalent resilient material; E, a strip of steel or other suitable metal disposed at the inner side of the tire D and having apertures $d$ at intervals of its length; F F, interiorly-threaded nuts arranged in the apertures $d$ of the strip E and having heads $e$ disposed at the outer side of the same, and G G bolts disposed in the apertures $c$ of the felly B and having their outer threaded ends engaged with the nuts F and the heads at their inner ends countersunk, by preference, in the inner perimeter of the felly. The rubber tire D, metallic strip E, and nuts F are connected together by vulcanization, this in order to hold them against movement with respect to each other and permit of them being handled as one piece in the application of the tire to a wheel.

Precedent to the application of my improvements to a new or old vehicle-wheel of the ordinary construction the wheel-tire is provided with the apertures $a$ and the felly with the sockets $b$ and the apertures $c$. The connected tire D, rim E, and nuts F are then placed on the wheel-tire with the nuts inserted in the apertures $a$ of said tire, and the bolts G are inserted in the apertures $c$ and screwed into the nuts F until the rim E is drawn tight against the tire C. With this done it will be observed that by reason of the bolts G bearing in the felly B and the nuts F bearing in the apertures $a$ of the tire C the rubber tire is securely fastened on the wheel in such manner that the strain, due to the tendency of the rubber tire to creep or casually move around the wheel, is distributed between the bolts G and nuts F, and the liability of either the bolts or the nuts breaking is reduced to a minimum.

The ends of the rubber tire D and metallic strip or band E are joined in the manner shown in Fig. 1—*i. e.*, one end $f$ of the band is extended, say, about one-fourth of an inch beyond the adjacent end of the tire and beveled on its outer side, and the other end of the tire is projected slightly—say about one-sixteenth of an inch—beyond the adjacent end $g$ of the band, which latter is beveled at its inner side. By virtue of this construction it will be observed that when all the bolts G are tightened and the ends of the rubber tire are drawn inwardly into alinement with each other they will be compressed, and hence will tend to retain each other in position.

In addition to being susceptible of ready application to a vehicle-wheel and durable my improvements are materially advantageous, because all of the rubber is disposed on and extends beyond the perimeter of the metal portion of the wheel, with the result that all of the rubber must be worn off before the metal can come in contact with the ground. This also insures the utilization of the full resilient value of the rubber, and the rubber has but one point of wear—viz., where it contacts with the ground. The improvements are further advantageous, because a short section of the rubber tire and its appurtenances may be readily removed and replaced with a new section without affecting the remainder of the tire or necessitating the removal of such remainder from the wheel.

Having described my invention, what I claim, and desire to secure by Letters Patent, is—

1. The combination with a wheel having a felly and a metallic tire provided with coincident apertures; of the rubber tire, the apertured metallic band arranged at the inner side of the rubber tire and on the exterior perimeter of the metallic tire of the wheel, and the headed, interiorly-threaded nuts extending through the apertures of the metallic band and resting in the apertures of the metallic tire of the wheel; said rubber tire, metallic band and nuts being vulcanized together, and headed and threaded bolts extending through the apertures of the wheel-felly and engaging the interiorly-threaded nuts.

2. The combination with a wheel having a felly and a metallic tire provided with coincident apertures; of the rubber tire, the apertured metallic band arranged at the inner side of the rubber tire and on the exterior perimeter of the wheel-tire and having one of its ends extended beyond the adjacent end of the rubber tire and exteriorly beveled, and its other end arranged in rear of the adjacent end of the rubber tire and interiorly beveled, and the headed, interiorly-threaded nuts extending through the apertures of the metallic band and resting in the apertures of the metallic tire of the wheel; said rubber tire, metallic band and nuts being vulcanized together, and headed and threaded bolts extending through the apertures of the wheel-felly and engaging the exteriorly-threaded nuts.

In testimony whereof I have hereunto set my hand in presence of two subscribing witnesses.

FRANK HOWARD HYDE.

Witnesses:
SETH H. ROWLIN,
JOHN M. OGILVIE.